United States Patent [19]

Trevarrow

[11] 4,288,180

[45] Sep. 8, 1981

[54] APPARATUS FOR TRUING BOLTING SURFACES OF WHEELS AND THE LIKE

[76] Inventor: David Trevarrow, 119 Reiniche, Horton, Mich. 49246

[21] Appl. No.: 19,970

[22] Filed: Mar. 12, 1979

[51] Int. Cl.³ ..................... B21D 53/26; B21K 1/28; B23D 41/00
[52] U.S. Cl. ..................................... 408/2; 29/159.1; 33/174 Q; 340/680; 340/689; 408/7; 408/12; 408/19; 408/40; 408/50; 408/70
[58] Field of Search ................. 408/2, 4, 7, 11, 13, 408/14, 19, 40, 41, 50, 53, 70, 10, 12; 29/159.01, 159.1; 340/680, 686, 689; 33/174 Q

[56] References Cited

U.S. PATENT DOCUMENTS

| | | | |
|---|---|---|---|
| 1,978,879 | 10/1934 | Ferris et al. | 408/10 |
| 2,703,994 | 3/1955 | Mezey | 408/40 |
| 3,091,202 | 5/1963 | Mackey | 29/159.1 X |
| 3,572,181 | 3/1971 | Schlegel | 340/680 |
| 3,688,373 | 9/1972 | Gregg | 29/159.01 X |
| 3,832,082 | 8/1974 | Judge, Jr. | 408/10 |
| 4,143,449 | 3/1979 | Main et al. | 29/159.1 |

FOREIGN PATENT DOCUMENTS

2302631 7/1974 Fed. Rep. of Germany ..... 29/159.1

Primary Examiner—Z. R. Bilinsky
Attorney, Agent, or Firm—William P. Hickey

[57] ABSTRACT

A machine for truing both the tire bead seats, and the side surfaces of a web of a wheel. The machine has a work supporting station with radially inwardly movable bead seat deforming jaws, and top and bottom machining heads on slides which move toward and away from the respective sides of the web of a wheel supported by the jaws. The axis of rotation of the machining heads are precisely concentric with the deforming jaws. The bottom machining head is used to chamfer the edges of bolting holes, and the top machining head is used to machine the bolting surfaces of the web. In the preferred embodiment, the bottom slide carries a plurality of gauging switches for contact with the web and for locating its welded position relative to the bead seats. The lower machine head also carries an adjustable gauge post which projects up past the jaws for contact by a gauging switch carried by the slide of the upper head. Upon actuation of the switch carried by the upper head, a predetermined depth of feed into the web is initiated to true the bolting surfaces. Angular misalignment is sensed by the gauging switches carried by the bottom head and the wheel rejected before machining if it is outside limits.

25 Claims, 10 Drawing Figures

APPARATUS FOR TRUING BOLTING SURFACES OF WHEELS AND THE LIKE

The present invention relates to apparatus for truing the major surfaces of thin discs relative to a peripheral reference surface; and more particularly to a machine for truing the bolting surfaces of a web of a wheel relative to the tire bead seats of its rim.

BACKGROUND OF THE PRESENT INVENTION

In the manufacture of wheels, flat sheets of metal are rolled into a cylinder and the ends are butt welded together. The cylinder thus made is passed between rolls which deform the cylinder into a section having a dropped center and opposing tire bead seats. A web is made by a stamping operation, and it is positioned inside of the dropped center section of the rim and is welded thereto.

It is impossible in any stamping operation to produce parts that have identical dimensions and contours due to nonuniform flow of the metal. Likewise, it is not possible in rolling operations to produce parts having identical shapes; and therefore, when rolled parts and stamped parts are welded together, the resulting articles will be even more nonuniform.

It might be possible to make wheels accurately using prior art procedures by first truing the rim and the web separately in deforming operations, as for example, by pressing between accurate surfaces, and then welding the two together. It is an object of the present invention, however, to provide apparatus which will take a wheel having a nontrued rim and a nontrued web that are welded together, and make a bolting surface on the web absolutely normal to bead seats in the rim.

The above object may be achieved using separate pieces of apparatus wherein one piece trues the bead seats, and another piece trues the bolting surfaces of the web. In the most preferred embodiment of the invention, however, both truing operations are done in a single machine utilizing the bead seat truing apparatus as a support and locator for the portions of the apparatus which do the truing of the bolting surface of the web.

DESCRIPTION OF THE PREFERRED EMBODIMENTS

Webs of wheels are made of sheet metal to provide a maximum of strength with a minimum thickness of metal. It will be apparent that any excess metal in a wheel not only adds to the weight of the vehicle, but more importantly, adds to the weight of the rotating masses which must be accelerated and decelerated during each start and stop of the vehicle. Any metal that is taken off of the webs of the wheel, therefore, must be precisely done within strict limits.

It will be possible to true the rim of a wheel in one piece of apparatus using some of the principles of the present invention, and then move the wheel to a second apparatus and true the surfaces of the web relative to the rim using other principles of the present invention. In the preferred embodiment, however, a single piece of machinery is provided wherein the jaws which true the tire bead seats of the rim, are used to hold the wheel in precise alignment for the truing operation of the web.

Figure 1:
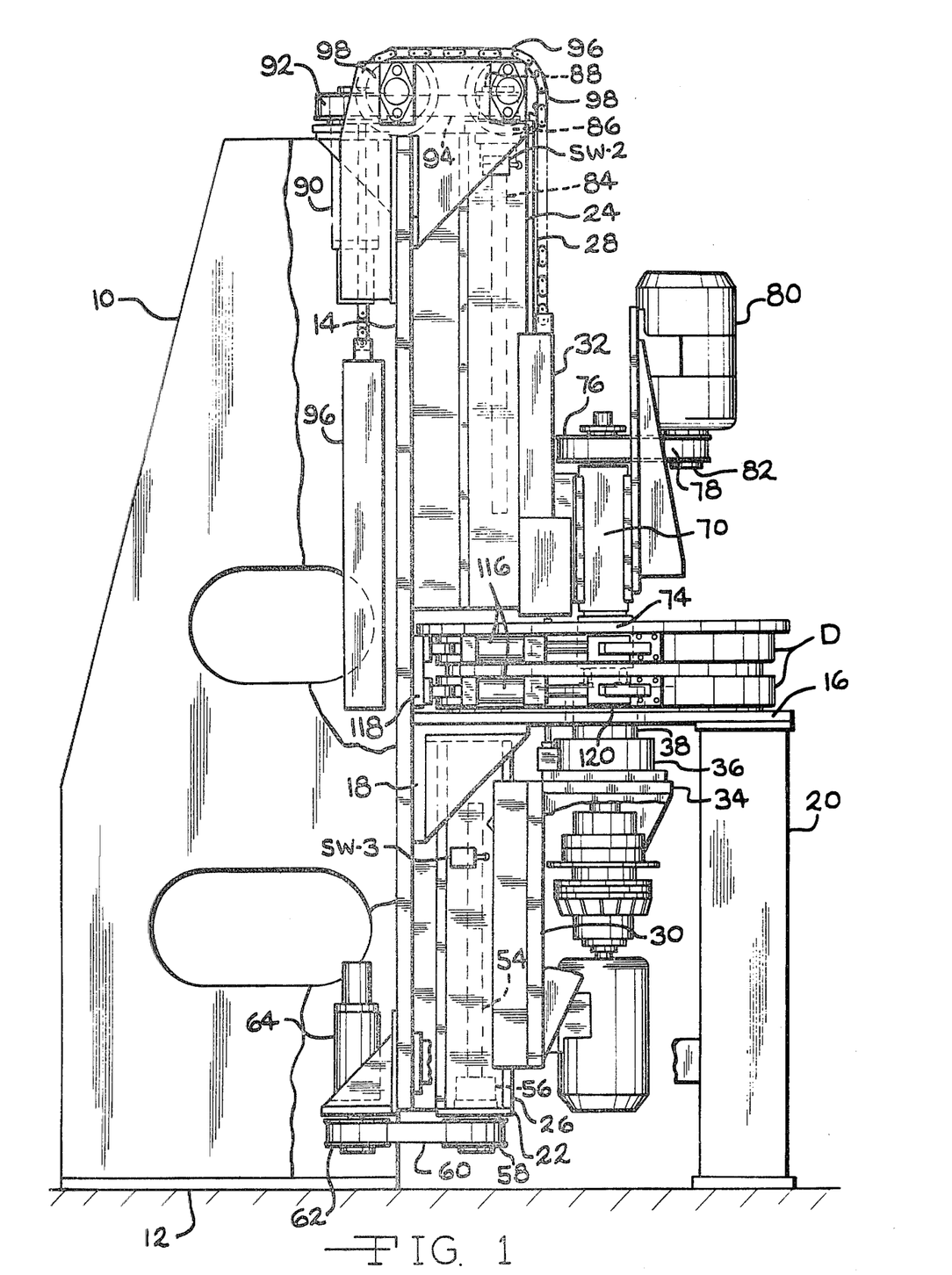
FIG. 1 is a side elevational view of apparatus which is constructed and which operates according to principles of the present invention.
Figure 2:
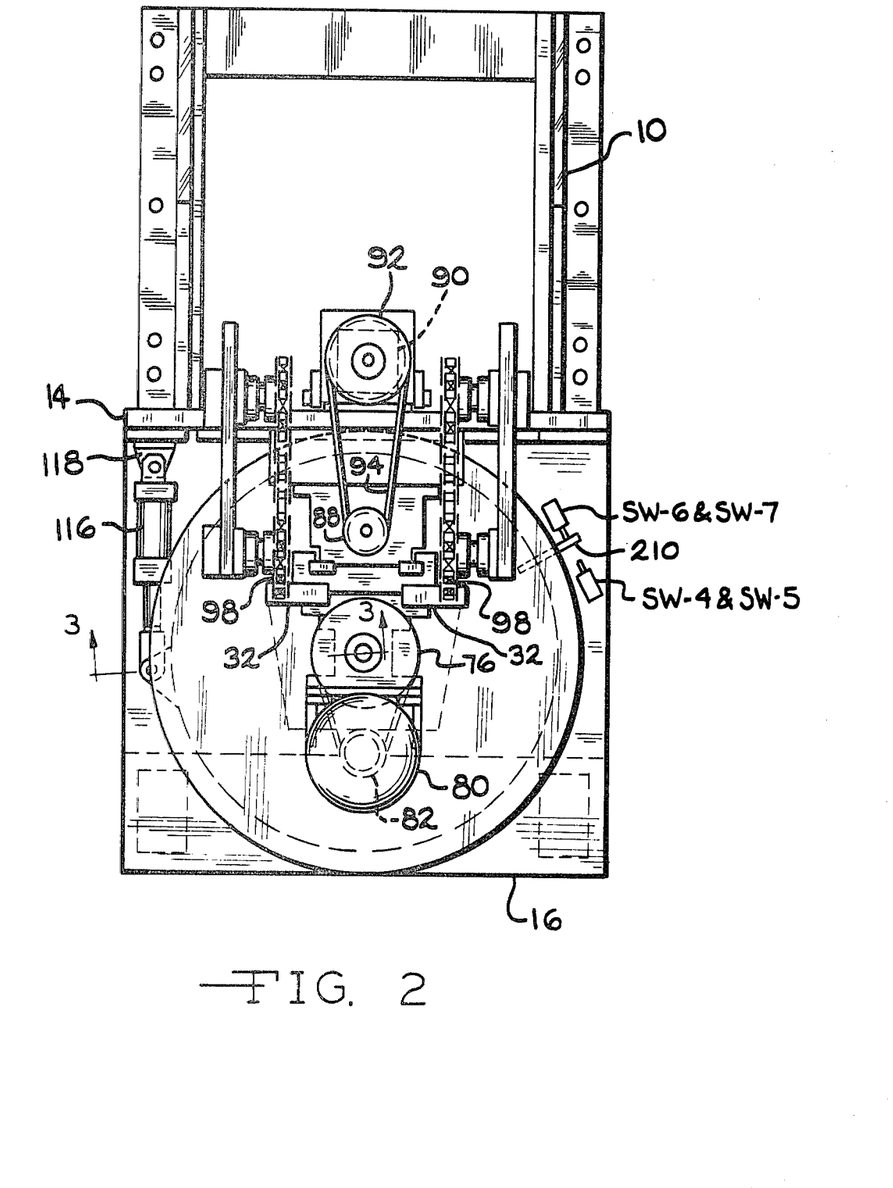
FIG. 2 is a plan view of the apparatus shown in FIG. 1.
Figures 6, 7:
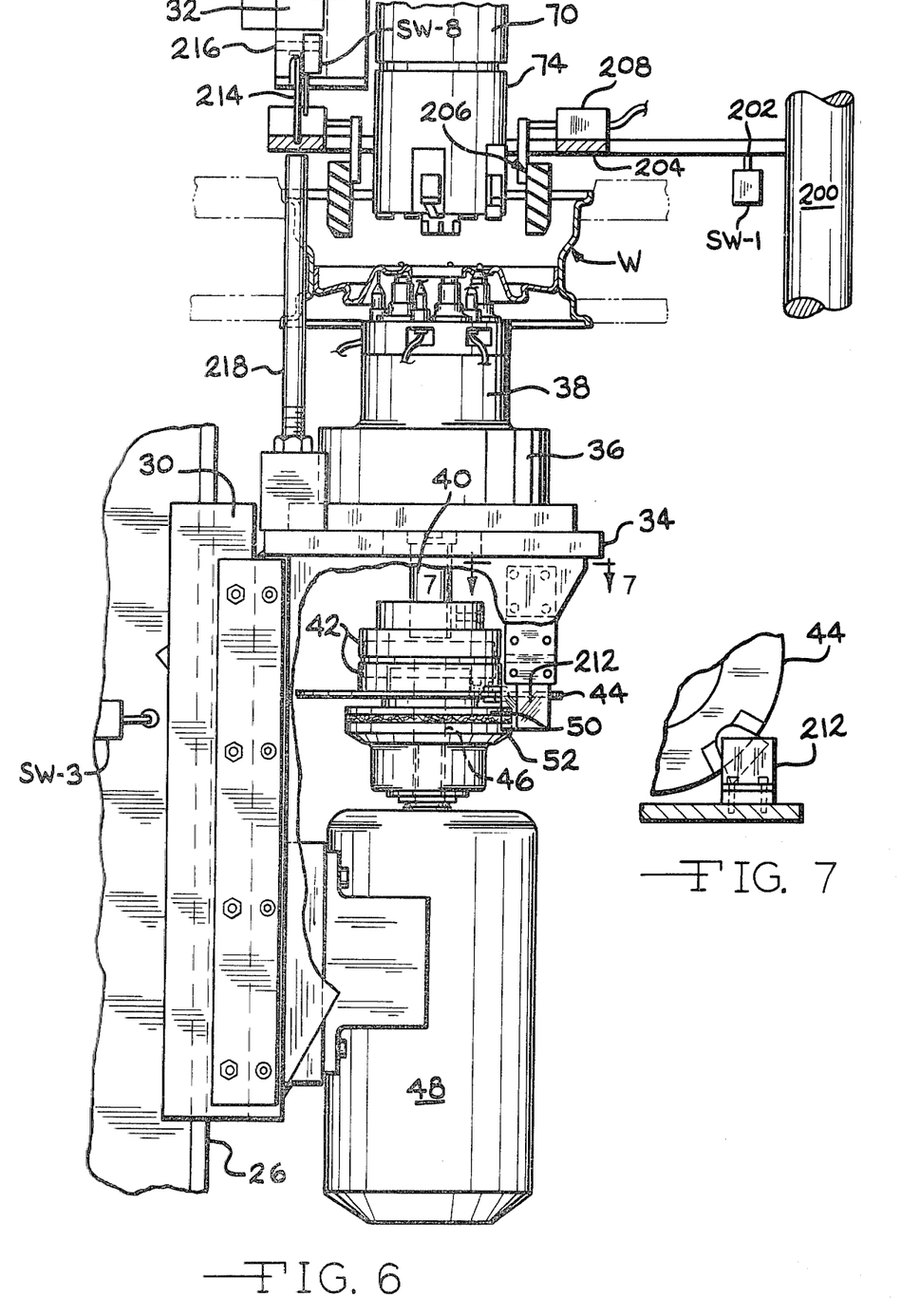
FIG. 6 is an enlarged fragmentary side elevational view, with portions broken away, and showing a wheel being worked upon by the apparatus.
FIG. 7 is a fragmentary sectional view taken approximately on the line 7—7 of FIG. 6.
Figure 8:
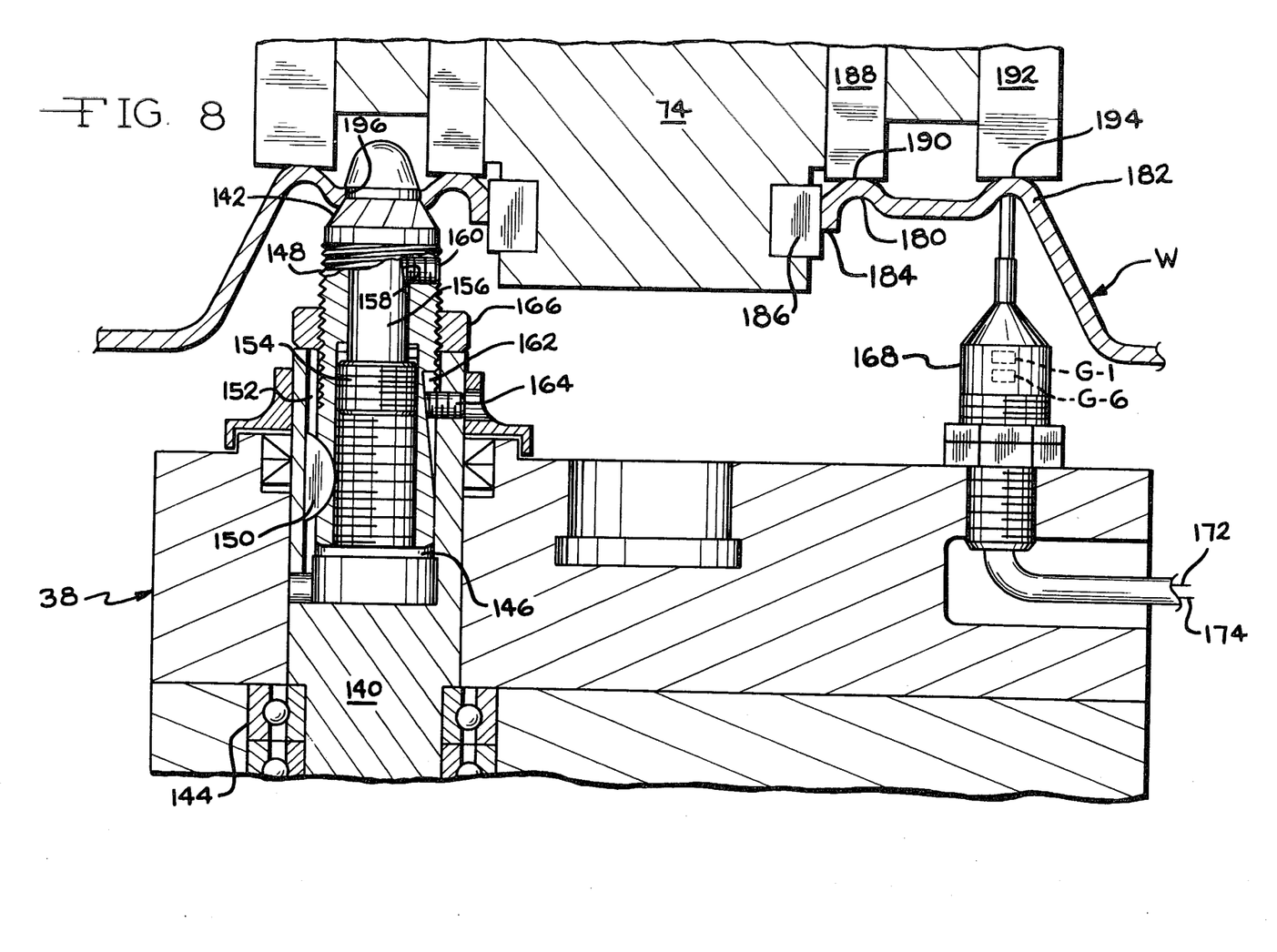
FIG. 8 is a greatly enlarged view of a wheel being machined by the top and bottom machining heads shown in FIG. 6.

As best seen in FIGS. 1, 2 and 6, the apparatus of the present invention generally comprises an upright frame 10 that stands upon a base plate 12, and which is faced with a vertical plate 14 to which components of the machine are bolted. A work station frame 16 is provided approximately half way up the facing plate 14. The inner end of the frame 16 is bolted to the facing plate 14 by means of a pair of angular brackets 18, while the outer ends of the work station frame 16 are supported by a pair of pedestals 20. The work station frame 16 in turn supports wheel deforming dies D, which will later be described in detail. A bolt-on way-frame 22 is secured to the facing plate 14 beneath the work station frame 16, and another bolt-on way-frame 24 is fastened to the facing plate 14 above the work station frame 16. The bolt-on way-frames 22 and 24 carry way surfaces 26 and 28, respectively, which are carefully aligned at right angles to the work station frame 16.

A lower slide 30 is hung off of the lower way surfaces 26 for movement toward and away from the bottom surfaces of the work station D, and an upper slide 32 is hung off of the way surfaces 28 for movement toward and away from the upper surface of the work station D. A horizontal bearing plate 34 is suitably affixed to the upper end of the lower slide 30, and the bearing plate 34 in turn supports a bearing housing 36 for a multiple spindle machining head 38 that projects from its upper end. A centrally located drive shaft 40 for the head 38 extends out of the bottom of the bearing housing 36, through an opening in the bearing plate 34, (see FIG. 6), into the top half of an alignment coupling 42. The bottom half of the alignment coupling 42 is secured to the top of a brake disc 44 and the two are suitably journaled about the projecting end of the shaft 46 of an induction drive motor 48. The top plate 50 of a friction clutch is secured to the bottom of the brake disc 44, and the bottom plate 52 of the friction clutch is nonrotatably secured to the motor shaft 46 by a suitable keyway.

The lower slide 30 is moved upwardly toward the work station D and downwardly away from the work station D by means of a ball lead screw 54 that is suitably received in the structure of the lower slide 30, and the shaft of which projects through bearing structure 56 that is fixed to the bottom of the lower way frame 22. The bottom of the shaft of the ball lead screw 54 is fixed to a cleat pulley 58 that is driven by a nonslip cleat belt 60. The cleat belt 60 is in turn driven by a similar pulley 62 that is affixed to the shaft of a vertically oriented servo drive motor 64 that is supported on the back side of the facing plate 14. The servo drive motor 64 is adapted to move the lower slide 30 upwardly at two different speeds, and to stop the lower slide 30 at a precise relative position to a wheel in the work station D, as will later be explained in detail.

The upper slide 32 is arranged for movement parallel to the bottom slide and carries a tubular spindle housing which journals a single spindle 72, the lower projecting end of which carries the upper machining head 74. The spindle 72 is driven by a belt pulley 76 that is in turn driven by a drive belt 78. An induction motor 80 is supported by the spindle housing 70 parallel to the spindle 72 and drives the belt 78 by means of a drive pulley 82.

The upper slide 72 is arranged to be withdrawn a considerable distance above the work station D in order that wheels can be loaded into and unloaded out of the top of the work station D. To facilitate loading and unloading, the slide 32 is provided with drive mechanism which provides a fast advance and retraction, a fast feed downwardly, followed by a slow feed downwardly. Slide 32 is driven by a vertical ball lead screw 84, the lower end of which engages structure of the slide 32. The upper end of the shaft of the lead screw 84 extends through a bearing housing 86 fixed to the upper end of the way frame 24, and is driven by a cleat pulley 88. Cleat pulley 88 is in turn driven by a servo drive motor 90 whose shaft projects up from the upper end of the frame 10 and carries the drive cleat pulley 92. Cleat pulleys 86 and 92 are opposite each other, and are connected by a nonslip cleat belt 94. In order to aid the precision with which the servo drive motor 90 can position the upper slide, particularly during rapid advance, the slide 32 is counterbalanced by a weight 96, which is positioned on the back side of the facing plate 14, and which is connected to the slide by a pair of roller chains 96. The roller chains pass over sprockets 98 that are suitably supported on the upper end of the frame of the machine. The upper slide 32 of the machining head is shown in its lowermost machining position in FIGS. 1 and 6 of the drawings; and it will be understood that the slide 32 and machining head 74 will be adjacent the top of the frame of the machine during loading and unloading of wheels into the work station D.

Figure 3:
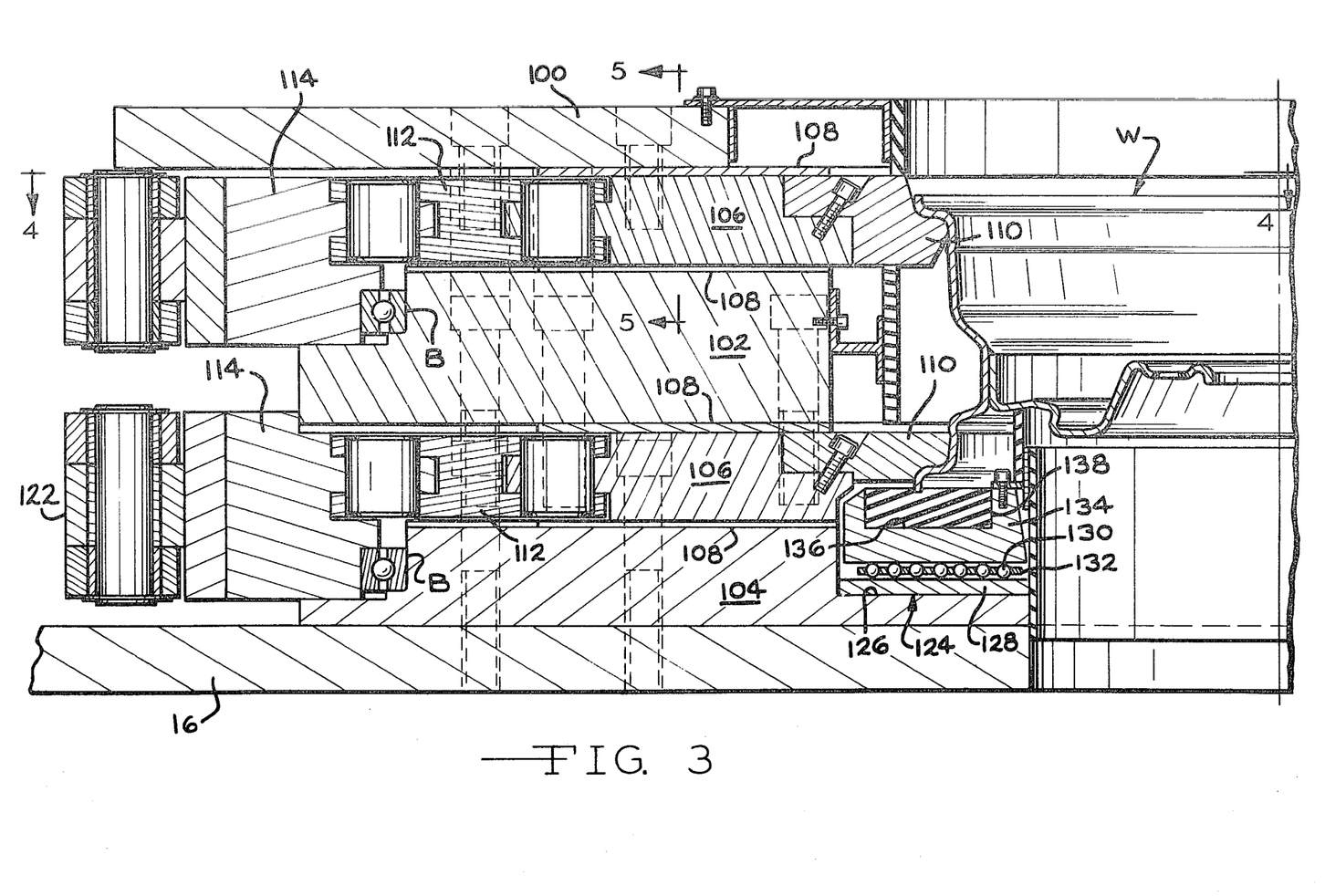
FIG. 3 is a fragmentary enlarged sectional view taken approximately on the line 3—3 of FIG. 2.
Figure 4:
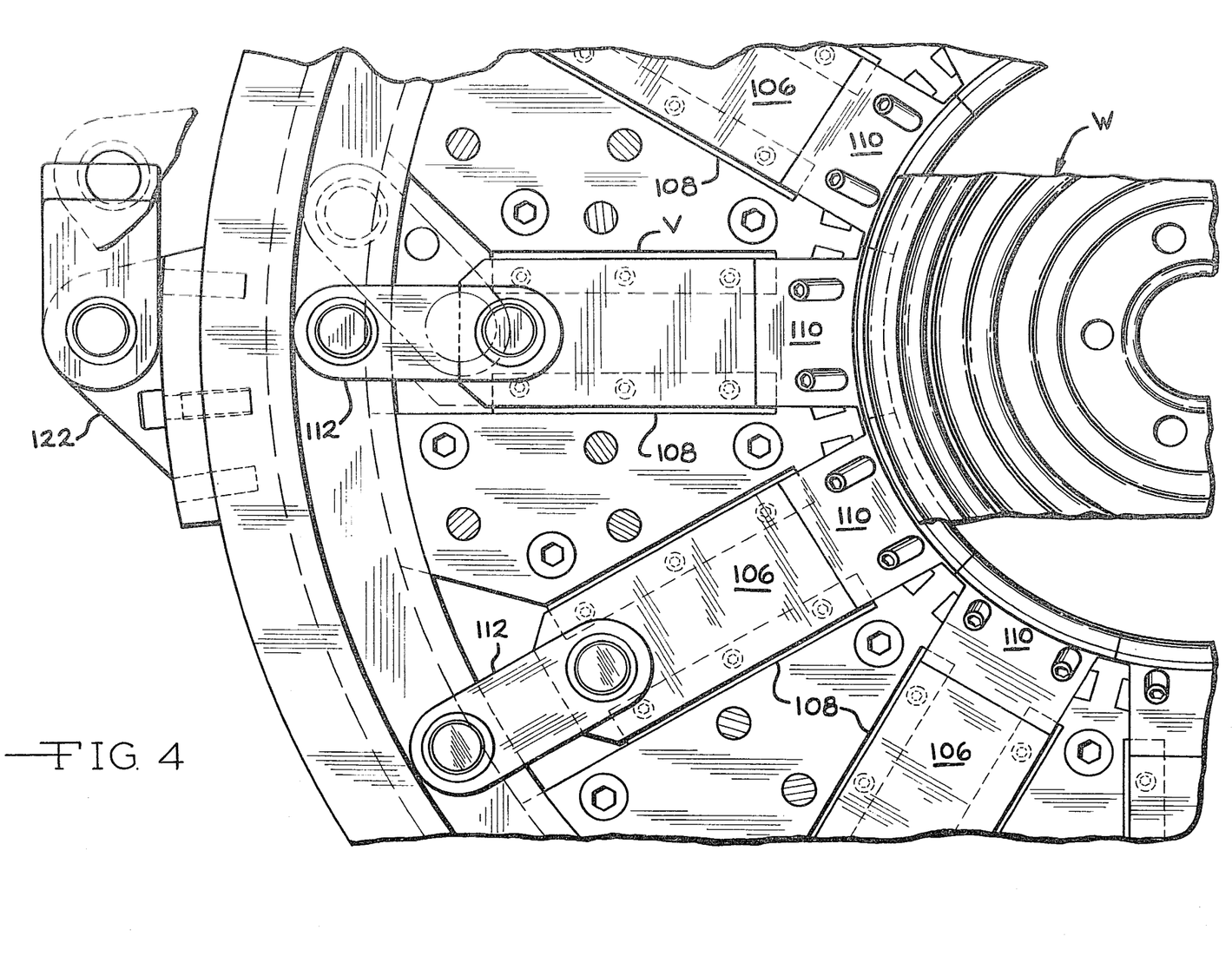
FIG. 4 is an enlarged fragmentary sectional view taken approximately on the line 4—4 of FIG. 3.
Figure 5:
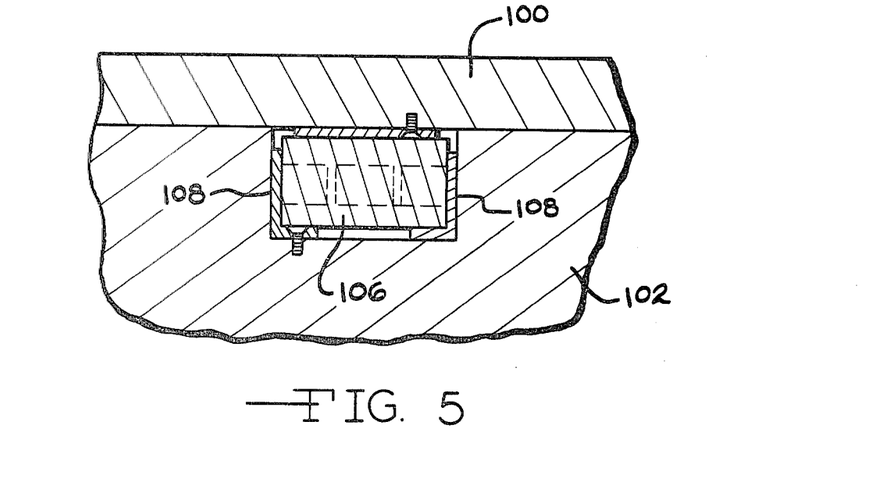
FIG. 5 is a fragmentary sectional view taken approximately on the line 5—5 of FIG. 3.

In the apparatus shown in the drawings, a rim shrinking die assembly D is located at the work station D, and is fastened to the top surface of the working station frame 16 precisely concentric with the axis of rotation of the lower machining head 38 and the upper machining head 74. The die assembly D is generally a self-contained unit comprising: upper, middle and lower die plates 100, 102 and 104, respectively, that are suitably contoured and bolted together to provide support for a plurality of radially extending master jaw slides 106, and their L-shaped brass guide plates 108. The L-shaped die plates 108 are suitably fixed to the upper, middle and lower die plates 100, 102, and 104, as the case may be, by suitable fasteners, not numbered. The inner ends of the jaw slides 106 are provided with hardened jaw tips 110 that are suitably shaped to abut the bead surfaces of the rim of an automotive vehicle and deform the bead surfaces radially inwardly. The outer end of the jaw slides 106 have toggles 112 suitably pinned thereto, and the outer end of the toggles 112 are suitably pinned to an appropriate one of a pair of actuating rings 114 which extend 360 degrees around the outside of the jaw slides 106. The lower actuating ring 114 is journaled to the outside of the lower die plate 104 by an antifriction bearing B comprising inner and outer raceways and a plurality of balls; and the upper actuating ring 114 is journaled to the middle die plate 102 in a like manner by an identical friction bearing B. The actuating rings 114 are adapted to be rotated approximately ten degrees by respective upper and lower hydraulic actuating cylinders 116 that are best seen in FIGS. 1 and 2. The cylinder end of the actuating cylinders 116 are suitably pinned to the facing plate 14 by suitable bifurcated brackets 118, and the piston rods of the actuating cylinders 116 are provided with bifurcated fittings 120 that are pinned to ears 122 that are welded to the appropriate actuating rings 114. Expanding the hydraulic cylinders 116 causes the actuating rings to move the toggles 112 from the dot-dash position shown in FIG. 4 to the solid position shown in FIG. 4, and in turn move the jaws 106 from their radially outer positions to their radially inner positions shown in FIGS. 3 and 4 of the drawings.

As previously indicated, wheels to be trued are fed to the apparatus shown in the drawing when the upper slide 32, and upper machining head 74 which it carries, are moved to the upper end of the frame free and clear of the work station D. The wheels are fed by a conveyor and work transfer means to a position over the work station D and are lowered into position so that the bead seats of the wheels rim is opposite the jaws 110. According to principles of the present invention, the wheel is supported in the appropriate position opposite the jaws 110 by a work support table 124 of unique construction and which is about to be described. As shown in the drawings, the work support table 124 is an annular table on which the lower rim of the wheel sets when the bead seats of the rims are opposite the jaws 110. In the present instance, the work support table 124 is supported in an annular recess 126 in the lower die plate 104. An annular bottom support plate 128 fits into the recess 126, and a plurality of identically shaped balls 130 are held by a cage plate 132 in spaced apart positions extending around the top surface of the plate 128, for the support of a thick annular surface plate 134. The surface plate 134 contains an annular groove 136 in the area beneath the innermost travel of the jaws 110, and an annular hard rubber surfacing disc 138 is positioned in the groove 136 for the support of the edge of the rim of the wheel being worked upon. The rubber surfacing disc 138 is of a thickness and resiliency which will accommodate lateral deflection of the edge of the rim as occurs when the opposing jaws 110 deform the bead seats of the rim radially inwardly. In addition, the rubber surfacing material 138 is of a lubricious nature which permits the edge of the rim to shift laterally during the time that the rim is being deformed radially inwardly. In addition, the whole surfacing plate 134 can move laterally over the top of the balls 130 to center the rim prior to its deformation by the jaws, should this be necessary to equalize forces around the rim. It will be seen that the work support table 124, therefore, will support the wheel in an approximate position, so that it can be caught by the jaws 110 and the table shifted laterally to provide an initial centering action. Thereafter the table permits the rim of the wheel to be pushed down into its resilient surface by whatever amount is necessary to accommodate the deflection of the rim as it is being deformed radially inwardly to the proper bead seat diameter.

Figure 9:
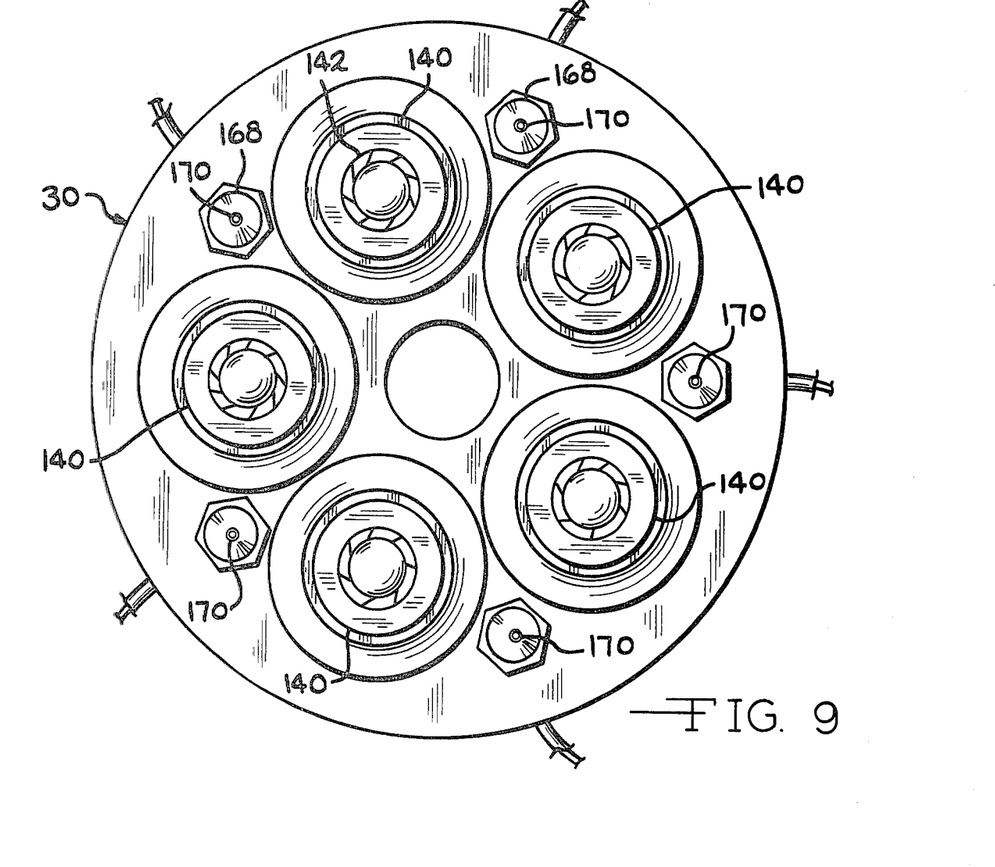
FIG. 9 is a plan view of the bottom machining head.

After the rim deforming dies have trued the bead seats, the lower slide 30 and multiple spindle machining head 38 which it carries, moves up against the bottom surface of the web of the wheel to chamfer the lug holes by which it will be fastened onto the hub of the axle of an automotive vehicle. In the embodiments shown in the drawings, and as best seen in FIG. 9, the multiple spindle machine head 38 being described has five spindles 140 each of which carries a conical cutter 142 appropriately tapered to chamfer the lug holes of the web of the wheel. Each of the spindles 140 are journaled by antifriction bearings 144, and are rotated by suitable gearing (not shown) that in turn is driven by the drive shaft 40. Each spindle 140 is bored out at its upper end, as at 146, to receive a tubular tool holder 148. The lower end of the tubular tool holder 148 has a woodruff key 150 lodged therein, which in turn slides in a keyway 152 that extends longitudinally of the inner wall of the spindle 140. The lower end of the tool holder is counterbored and threaded to receive a set screw 154 that is adjustable against the bottom end of the shank 156 of the cutter 142. The shank 156 has a wedge shaped groove 158 longitudinally thereof, into which a set screw 160 is tightened to hold the cutter 142 down into engagement with the set screw 154. The tool holder 148 in turn has a wedge shaped groove 162 into which a set screw 164 is tightened to lock the tool holder to the spindle. In addition, the upper end of the tool holder 148 is threaded, and a threaded lock nut 166 is tightened down onto the end of the spindle 140 to lock the tool holder in place.

The lower multiple spindle head 38 also carries a plurality of gauging switches spaced evenly around the head beneath the outer annular bolting surface of the web that is to be machined by the top slide, as will later be described. The gauging switches 168 are precisioned instruments and have contact pins 170 that extend down into the body of the switches to sequentially open a first switch and then close a second switch after approximately 0.0030 inch of travel. The first switch controls the energization of wire 172 and the second switch controls the energization of wire 174.

The inner face of the wheels being trued are stamped with inner and outer concentric rings 180 and 182, respectively, and an outwardly bent tubular portion 184 for bearing contact with the axle hub of the automotive vehicle on wich it is to be installed. The upper head 74 contains a set of concentric cutters 186 suitably held for feeding axially through the tubular portion 184 to give it a cylindrical machined surface for gripping the hub. The head 74 also contains another set of spaced apart milling cutters 188, the bottom ends of which are beveled at approximately a three degree angle to the horizontal for milling a flat bolting surface 190 on the inner surface of the ring 180. The head 74 is provided with another set of milling cutters 192, the end surfaces of which are also tapered at a three degree angle for milling a bolting surface on the inner ring 182. The cutters 188 and 192 have their cutting surfaces aligned so that their revolution defines the surface of a flat cone which forms an angle of 93 degrees with the cylindrical surface that is machined on the tubular portion 184 by the cutters 186. The metal between the bolting surfaces 190 and 194, and which contain the lug holes 196, is bent outwardly at approximately a 45 degree angle. The cutters 142 are beveled at approximately a 60 degree angle so that a lug that is tapered at approximately a 45 degree angle will put the metal between the lug and the holding surfaces 190 and 194 in direct compression. When the wheel is abutting a radial surface, the web is bent at a point outwardly of the outer bolting surface 194 enough to cause the bolting surfaces 194 and 190 to become planar against the radial surface of the hub on which the wheel is being bolted. The surfaces 190 and 194 at this time will be flat against the radial surface, with their full machined surface in contact therewith to keep bearing stresses at a minimum. In addition, the deflection of the center portion of the web as above described will cause the outer end of the tubular portion 184 to be shrunk radially inwardly to tightly grip and center the web on the cylindrical portion of the hub of the axle on which the wheel is being bolted. It will further be seen that the apparatus of the present invention causes the bolting surfaces 190 and 194 to be absolutely true with respect to the plane passing through the trued bead seats, so that the bead seats run absolutely true with the axle of the vehicle.

It has been found that the wheels of the present invention have greater service life than do wheels that are identically made, but which have not had the bolting surfaces 190 and 194 machined, even though the rims have been deformed radially concentric with the lug holes. The reasons why this is so are not fully known at this time, but it is believed that this fact shows that the angular misalignment of the bolting surfaces of the web with respect to the rim, causes the metal of the web to be fatigued by axially changing stresses as the tire rolls over paved surfaces, and that the present invention greatly reduces these stresses.

As previously indicated, the wheels are loaded and unloaded from the mechanism above described by a transfer mechanism which takes the wheels from a conveyor and loads it onto the work table. After the wheel is machined, the transfer mechanism moves the wheel up out of the dies, and then indexes to bring another wheel into position. This mechanism is shown schematically in FIG. 6. The mechanism comprises a vertical shaft that both rotates and moves vertically up and down, and a plurality of arms 202 which carry rings 204 that are to be centered over the work station. Each ring 204 has a plurality of levers 206 pivoted thereto. The bottom end of the levers 206 grip the rim of the wheel, and the upper end of the levers are moved in and out by air cylinders 208 to produce the gripping action. A switch SW-1 is shown schematically as positioned beneath the position of the arm 202 after it has loaded a wheel onto the supporting table 124, and when the switch SW-1 is actuated, it initiates the operation of the machine about to be described.

At the time that a wheel is lowered onto the work table 124, the upper slide 32 is in engagement with the switch SW-2 at the upper end of the frame, and the lower slide 30 is in engagement with the home position switch SW-3—in which position, the multiple spindle head 38 is just beneath the rim of the wheel resting on the table 124. The air cylinders 208 unclamp the wheel at the time SW-1 is actuated, and simultaneously therewith, the lower chuck actuating cylinder 116 is actuated to move a trip dog 210, carried by the lower chuck actuating ring 114, from the chuck retracted switch SW-4 into engagement with the chuck advanced switch SW-6. Shortly thereafter, the dog 210 on the top actuating ring 114 moves out of engagement with the chuck retracted switch SW-5, and into engagement with the chuck advanced switch SW-7. When both switches SW-6 and SW-7 are actuated, the servo motor 64 which actuates the bottom slide, and the servo motor 90 which actuates the top slide, become actuated. It will be understood that the drive motor 48 of the bottom machining head 38, and the drive motor 80 for the upper machining head 74 are rotating at this time since they operate continuously once the electrical system for the machine is energized. Shortly after the bottom slide starts upwardly, the cutters 142 start the countersinking of the various lug holes. Shortly after the countersinking starts, the contact pins 170 which are positioned beneath the cutting surfaces of the cutters 140 and 142 start to engage the web. As previously indicated, the contact pins 170 on initial contact with the web actuate a first switch contact therein (which will be designated G-1 through G-5 for each of the five gauging switches 168). Upward movement of the bottom slide will continue until such time as the second switch contact of the first gauge 168 is actuated. These contacts will be designated G-6 through G-10. If at the time that the first of the second switches contacts G-6 through G-10 are actuated, all of the switches G-1 through G-5 have been actuated, the web is deemed to be within angular tolerance, and the operation of the machine will continue as will later be described. If, however, all of the contacts G-1 through G-5 are not actuated at the time the first of the contacts G-6 through G-10 are actuated, the wheel is deemed to be defective, and the operation of the machine is interupted to retract the chucks and remove the wheel from the machine.

Assuming that the web is within angular tolerance, the servo motor 64 is caused to remain stationary, the clutch 42 for the lower spindles is deenergized, and a caliper brake 212 is actuated to clamp the brake disc 44 and stop rotation of the bottom spindles.

As previously indicated, the servo motor 90 for the top slide was actuated at the same time that the servo motor 64 for the bottom slide was actuated. The initial actuation of the servo motor 90 causes the top slide 32 to move downwardly at a fast advance speed until the actuating pin 214 of a gauge switch 216 carried by the top slide 32 is caused to engage an abutment rod 218 that is carried by the bottom slide 30. The abutment rod 218 is adjustable and sticks up vertically from the top surface of the bottom slide 30 through the work station D to be engaged by the actuating pin 214. Gauge switch 216 contains two contacts G-11 and G-12, the first of which is actuated upon immediate contact of the pin 214 with the rod 208 to stop the fast advance of the top slide 32, and start a fast feed movement for the slide which causes the axial cutters 186 to move through the tubular bent portion 184 of the wheel with a lateral machining feed. After the bottom edge of the cutters 186 have proceeded past the bottom edge of the tubular portion 184, contact G-12 of the switch 216 is actuated to start a slow speed actuation of the servo motor 90 that causes the cutters 188 and 192 to move into end milling abutment with the concentric rings 180 and 182 of the rim to machine the concentric bolting surfaces 190 and 194.

While the machining of the bolting surfaces 190 and 194 is taking place, chamfer cutters 142 are held stationary and into tight engagement with the web of the wheel. During this time, servo motor 64 opposes any movement of its rotor out of its set position. After a further predetermined movement of approximately 0.010 inches of the slide, another switch SW-8 contacts the top surface of the post 218 to deenergize the top servo motor 90 and thereby limit the depth of cut of the bolting surfaces 190 and 194. A timer causes the drive 80 for the cutters to continue rotating for a brief period until the cutters clean up the surfaces 190 and 194. After the dwell timer times out, servo motors 64 and 90 are both reverse energized to retract the slides 30 and 32 simultaneously. Since the bottom slide 30 has the shortest distance to travel, it hits the home switch SW-3 shortly thereafter, and causes the bottom servo motor 64 to be deenergized.

At the same time that the servo motors 64 and 90 were reverse energized by the timer, both cylinders 116 were actuated for retraction to bring both dogs 110 into engagement with switches SW-4 and SW-5. After switches SW-4 and SW-5 are actuated, a suitable time delay is produced by a timer to allow the top slide 32 to move free and clear of the work station D. When the timer times out, it causes the air cylinders 208 to be actuated to grip the wheel and the vertical shaft 200 of the transfer mechanism to start upwardly. The shaft 200 then rotates to move the machined wheel away from the machine and bring a new wheel into position for lowering onto the work support table 124. By this time, the top slide 32 will have reached the top home position switch SW-2 to actuate the same. When the arm 202 of the transfer mechanism has moved downwardly to lower the wheel into proper position, it actuates the switch SW-1 and the cycle is repeated.

Figure 10:
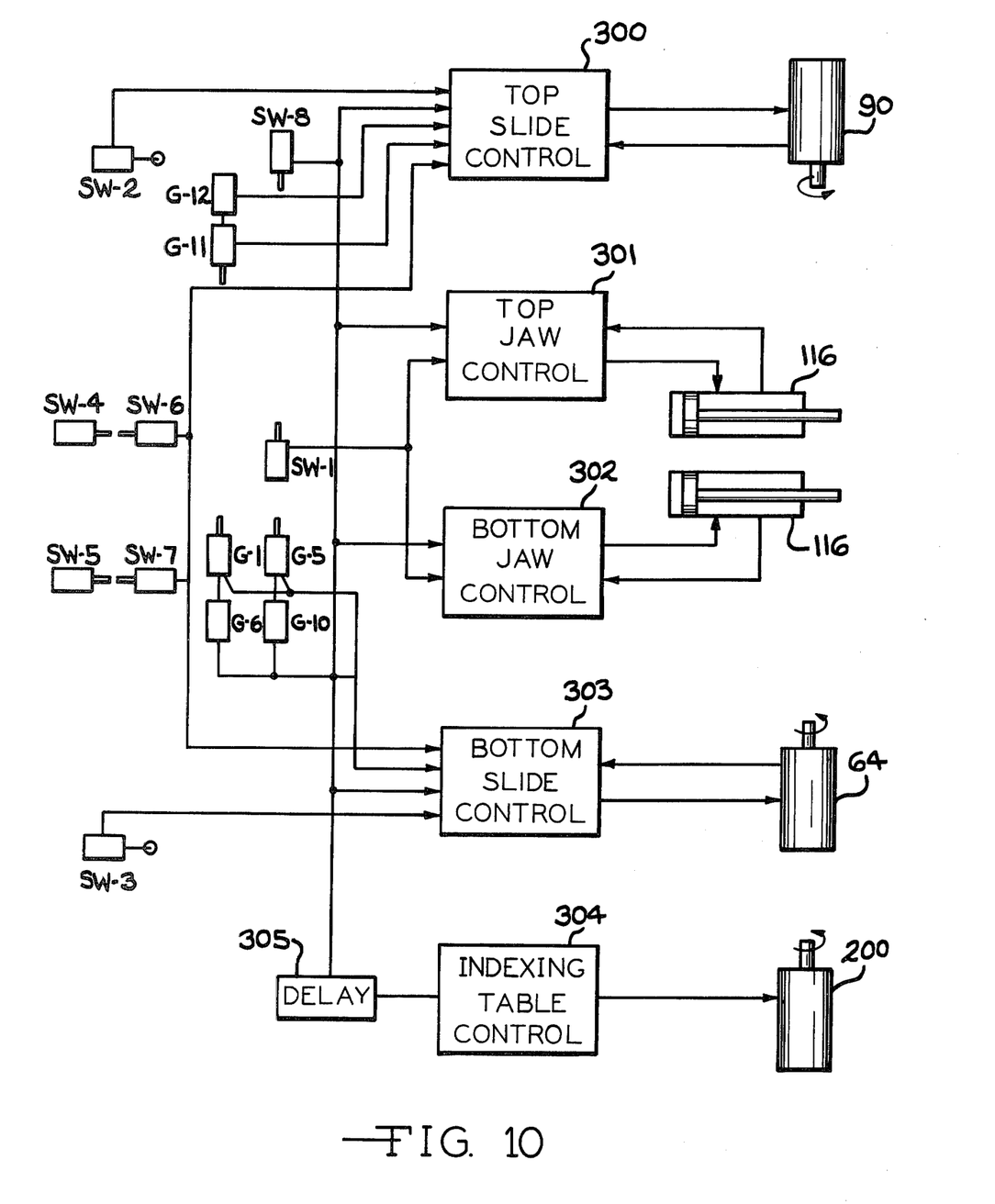
FIG. 10 is a block diagram of the electrical control system of the machine shown in FIGS. 1 through 9.

FIG. 10 is a block diagram showing how the electrical signals from the various switches are utilized to produce the desired control of the various actuators of the machine, be they fluid pressure motors or electrical motors. In the diagram, five modules are shown which take various combinations of input signals and initiate a desired output control signal for the actuator which they control. Each of the modules will comprise a plurality of AND gates, NOR gates, pulsers, time delays, etc., for taking the various input signals and providing the desired output signal, as will be understood by those skilled in the electrical controls.

As previously indicated, switch SW-1 is actuated by the loading and unloading table where it moves down into position. When the switch SW-1 is actuated, it puts out a signal to the top jaw control 301 and bottom jaw control 302 to expand the top and bottom cylinders 116 sequentially, depending upon the time delay pattern that has been built into one of the respective controls 301 and 302. When the cylinders 116 reach their respective expanded conditions, the top and bottom jaw actuated position switches SW-6 and SW-7 are actuated to put out a signal to the top slide control 300 and bottom slide control 303 to cause both of them to advance toward the workpiece. The bottom slide control 303 only provides one speed of advance, but the top slide control 300 provides a fast advance initiated by the signal of the switches SW-6 and SW-7 and later modified, as will later be explained.

The bottom slide has only a short distance to move so that it quickly moves the gauging switches G-1 through G-5 into engagement with the workpiece. The diagram shows a single line leading from the gauging switches G-1 through G-5, but it will be understood that there are separate lines leading to the bottom slide control 303, and when signals of all five switches G-1 through G-5 reach the bottom slide control, it terminates the advance signal for the bottom slide motor 64. The gauging switches G-1 through G-5 have second contacts G-6 through G-10, respectively, which are operated after a predetermined movement. If one of the switches G-6 through G-10 is actuated, thereby indicating that a web of a wheel is beyond angularity limits, the signal from the contacts G-6 through G-10 is fed to the bottom slide control 303, top jaw control 301, bottom jaw control 302, top slide control 300, and to the index table control 304 through time delay 305 to retract all systems and index the loading mechanism to remove the part.

At the time that the gauging switches G-1 through G-5 have been actuated, the top slide (because it has a greater distance to travel) is still moving downwardly toward the workpiece. Shortly thereafter, its gauging switch G-11 will contact the post 218 to become actuated, and it, in turn, sends a signal to the top slide control 300 which modifies the advance signal initiated by the switches SW-6 and SW-7 into an intermediate rate of feed suitable for a side edge cutter machining operation. After a further predetermined distance of travel, the contact G-12 of the gauging switch is made, and it then sends a signal to the top slide control 300 which modifies the advance to a still slower feed for an end milling operation. After a still further slight movement, the post 218 contacts the switch SW-8 which puts out an actuating signal that is fed to the top slide control 300, top jaw control 301, bottom jaw control 302, bottom slide control 303, and the indexing table control 304 through a time delay 305. These controls in turn put out a retraction signal to the top slide motor 90, top and bottom jaw cylinders 116, bottom slide actuator motor 64, to cause them to move to their retracted positions and reset. In the retracted position, the top slide will actuate switch SW-2 to put out a signal to the top slide control 300 which deenergizes the motor 90. The top and bottom jaw cylinders 116 will move the jaws into engagement with the retraction switches SW-4 and SW-5, which in turn cause a deactuation of their cylinders; and the switch SW-3 puts out a signal to the bottom slide control 303 to deactuate its motor.

After a suitable time delay determined by the time delay 305, a signal is provided for the indexing table control 304, which causes it to clamp onto the wheel in the machine, raise the shaft 200 upwardly, and index the shaft to move the wheel out of the machine, and tower a new wheel into the machine. When the shaft 200 is in its lowered position, it actuates the switch SW-1 to start the cycle over again.

In the diagram described above, control wires are not shown connected to switches SW-4 and SW-5 since the cylinders may work against stops and need not necessarily be deactuated in their retracted positions.

It will now be seen that the modus operandi of automatic controls have been given which will cause the machine to continually recycle as long as the parts received are within tolerance, and the parts do not become jammed in the machine for some reason or other. It will further be understood that suitable controls can be provided for taking care of emergencies, but that such controls need not be understood for the purposes of the present invention.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates.

I claim:

1. A machine for truing the opposite surfaces of tool deformable workpieces relative to their sides, comprising: a frame having a work station intermediate the ends of said frame, chucking means at said work station for accurately positioning a tool deformable workpiece at generally right angles to said frame, a first slide on said frame for movement toward and away from one side of said workpiece, said first slide having tooling thereon for machining surfaces of the workpiece held by said chucking means, a second slide on said frame for movement toward and away from the opposite surfaces of a workpiece held by said chucking means, a cutter on said second slide rotatable about an axis paralleling the slide movement toward and away from the workpiece, and control means holding said tooling on one of said first and second slides in cutting position against the workpiece while causing said cutter on said other one of said slides to finish its cutting operation on the workpiece.

2. The machine of claim 1 wherein said cutter on said second slide has end surfaces fed endwise into the workpieces, and said first slide is held stationary with its cutters against the workpiece while said cutters on said second slide finish their machining operation.

3. The machine of claim 1 including a plurality of gauges, each having a workpiece contacting actuator carried by one of said slides, each of said gauges having a first contact actuated upon a first predetermined movement of its actuator and a second contact actuated upon a further predetermined movement of its actuator, and means completing machining of the workpiece if all of said first contacts are actuated before any of said second contacts are actuated and rejecting the workpiece if one of said second contacts are actuated before all of said first contacts are actuated.

4. A machine for turing the opposite surfaces of workpieces relative to their sides, comprising: a frame having a work station intermediate the ends of said frame, chucking means at said work station for accurately positioning a workpiece at generally right angles to said frame, a first slide on said frame for movement toward and away from one side of said workpiece, said first slide having tooling thereon for machining surfaces of the workpiece held by said chucking means, a second slide on said frame for movement toward and away from the opposite surface of a workpiece held by said chucking means, a plurality of gauges, each having a workpiece contacting actuator carried by one of said slides, each of said gauges having a first contact actuated upon a first predetermined movement of its actuator and a second contact actuated upon a further predetermined movement of its actuator, means completing machining of the workpiece if all of said first contacts are actuated before any of said second contacts are actuated and rejecting the workpiece if one of said second contacts are actuated before all of said first contacts are actuated, a gauge on said other one of said slides with an actuator that abuts a surface carried by said one of said slides, said one of said slides remaining stationary after all of its first contacts are actuated, and said other one of said slides terminating its machining movement into the workpiece after a predetermined amount of travel after its gauge actuator abuts said surface carried by said one of said slides.

5. The machine of claim 4 wherein an adjustable post projects from one of said slides past the workpiece toward the other one of said slides to form said gauge abutting surface.

6. The machine of claim 4 wherein an adjustable post projects from said one of said slides past the workpiece toward the other one of said slides to form said gauge abutting surface.

7. The machine of claim 4 wherein the machining surfaces of said one of said slides is held into abutment with the workpiece being machined while said other of said slides does its machining.

8. A machine for machining top and bottom surfaces of a workpiece having chuckable sides, comprising: a chuck for holding the sides of a workpiece, a first machining slide arranged for movement toward and away from one side of a chucked workpiece, a second machining slide arranged for movement toward and away from the opposite side of the chucked workpiece, a feeler gauge mechanism on said first slide for sensing the work and which terminates movement into the workpiece after a predetermined slide movement thereafter, and means on said second machining slide sensing the terminated position of said first slide and terminating its depth of cut from the sensed terminated position of said first slide.

9. Apparatus for machining the bolting surfaces of the web of a wheel perpendicularly with respect to the bead seats of the rim of the wheel, said machine comprising: chucking means for chucking the wheel from said bead seats, a machining head supported for movement perpendicularly to the bead seats when held by said chucking means, gauging means for determining that a web supported in said chucking means is within a predetermined angularity with respect to the rim held by said chucking means, and means controlled by said gauging means for causing said machining head to make a predetermined cut into the bolting surfaces.

10. Apparatus for machining the bolting surfaces of the web of a wheel perpendicularly with respect to the bead seats of the rim of the wheel, said machine comprising: chucking means for chucking the wheel from said bead seats, a machining head supported for movement perpendicularly to the bead seats when held by said chucking means, gauging means for determining that a web supported in said chucking means is within a predetermined angularity with respect to the rim, means controlled by said gauging means for causing said machining head to make a predetermined cut into the bolting surfaces, said gauge means including a plurality of gauges each having a work sensing element and first and second contacts actuated thereby, said gauges being spaced to cover the bolting surface of the web, said first contacts being actuated after initial contact of said work by said sensing elements and said second contacts being actuated after a predetermined movement of said work sensing elements, said gauging means actuating said controlled means when all of said first contacts are actuated before one of said second contacts is actuated.

11. Apparatus for truing a surface of workpieces and rejecting the workpieces whose surface is outside angular limits, said apparatus comprising: clamping means for side surfaces of a workpiece which surfaces have an approximate predetermined relationship to the unfinished surface to be trued, a first machining head supported for movement toward and away from said unfinished surface of a workpiece held by said clamping means, a plurality of spaced apart sensing means carried by said machining head for contact with said unfinished surface of the workpiece, each of said sensing means having a first contact actuated after initial contact with said unfinished surface and a second contact actuated after a predetermined subsequent machining head movement toward the workpiece, said machining head performing work on said workpiece during movement between actuation of said first and second contacts, and control means connected to the first and second contacts of said plurality of sensing means and indicated rejection of the workpiece if all of said first contacts are not actuated before any of said second contacts are actuated.

12. The apparatus of claim 11 including: a second machining head on the opposite surface of the workpiece for movement toward and away from said first machining head by a distance approximating the travel of said first head between actuation of said first and second contacts, and means controlled by said control means for iniitiating said movement of said second machining head after it is in position to machine the opposite surface of the workpiece.

13. The apparatus of claim 12 wherein said last mentioned means includes a switch carried by one of said machining heads, and a switch actuating surface therefor carried by the other of said machining heads for initiating the machining of the opposite surface of the workpiece by said distance approximating the movement between actuation of said first and second contacts.

14. The apparatus of claim 13 wherein the work performing surfaces of said first machining head are held stationary at their limit of travel into said workpiece while said second machining head is machining said opposite surface of said workpiece.

15. Apparatus for truing up the bolting surface of the web of a wheel having tire bead receiving surfaces, comprising: support means for the tire bead receiving surfaces, a first machining head supported for movement toward and away from the web surface opposite the wheels bolting surface for machining tapered bolt holes in the web, a plurality of spaced apart sensing means carried by said machining head for contact with said unfinished surface of the workpiece, each of said sensing means having a first contact actuated after initial contact with said unfinished surface and a second contact actuated after a predetermined subsequent machining head movement toward the workpiece, said machining head performing work on said workpiece during movement between actuation of said first and second contacts, a second machine head on the opposite surface of the web for movement toward and away from said first machining head by a distance approximating the travel of said first head between actuation of said first and second contacts, and control means for actuating said second machining head if all of the first contacts are actuated before any of said second contacts are actuated and indicating rejection of the workpiece if all of said first contacts are not actuated before any of said second contacts are actuated.

16. The apparatus of claim 15 wherein the work performing surfaces of said first machining head are held stationary at their limit of travel into said workpiece while said second machining head is machining said opposite surface of said workpiece.

17. Apparatus for machining the inside bolting surface of a wheel having a web with two concentric bolting surfaces and a rim with concentric tire bead receiving surfaces, said apparatus comprising: means for supporting the wheel accurately with respect to the tire bead receiving surfaces, a rotatable machining head accurately supported with its axis of rotation concentric to said means for supporting the wheel, said machining head having end milling cutters for machining the two concentric bolting surfaces at right angles to the tire bead receiving surfaces of the wheel, and means for moving said head axially to machine the wheel.

18. The apparatus of claim 17 including axially extending cutters on the center of said machining head and projecting axially outwardly of said milling cutters for machining a center locating hole in the wheel, said axially extending cutters being arranged to feed sideways in conventional manner through the web of the wheel.

19. The apparatus of claim 18 including means for advancing said machining head axially into the wheel with two axial feed rates, comprising a first fast feed rate for moving said axially extending cutters through the web and a slow feed rate for moving said milling cutters into the web.

20. Apparatus for machining the inside bolting surface of a wheel having a web with two concentric bolting surfaces and a rim with concentric tire bead receiving surfaces, said apparatus comprising: means for supporting the wheel accurately with respect to the tire bead receiving surfaces, a rotatable machining head accurately supported with its axis of rotation concentric to said means for supporting the wheel, said machining head having end milling cutters for machining the two concentric bolting surfaces at right angles to the tire bead receiving surfaces of the wheel, power means for moving said head axially to machine the wheel, a plurality of gauging switches having a web sensing element and first and second switch contacts actuated thereby and supported for engaging the web, means causing said web sensing element of said gauging switches to move into engagement with the web prior to said milling cutters moving into engagement with the web, and means preventing said power means from moving said end milling cutters against the web if one of said second contacts are actuated before all of said first contacts are actuated.

21. The apparatus of claim 17 wherein said means for supporting the wheel engages at least one of the tire bead receiving surfaces.

22. The apparatus of claim 10 wherein said means for supporting the wheel engages at least one of the tire bead receiving surfaces.

23. In a machine having workpiece clamping jaws, top and bottom slides movable normal thereto for machining the top and bottom surfaces of workpieces held in the jaws, and an indexing table which raises, turns, and lowers to unload and load workpieces to the clamping jaws: a feed actuator for moving the indexing table, a jaw actuator for closing and opening the jaws, a top slide actuator for moving the top slide between retracted and finish machined positions, a bottom slide actuator for moving the bottom slide between retracted and finish machined positions, a first retracted position switch for resetting the top slide actuator, a second retracted position switch for resetting the bottom slide actuator, a third clamping position switch for resetting the jaws actuator, a plurality of work sensing gauging switches on the bottom slide with each having first and second sequentially actuated contacts, an adjustable abutment carried by the bottom slide, fourth and fifth sequentially actuated switches carried by the top slide and actuated by said adjustable abutment, and a sixth switch actuated when the indexing table is in its lowered position, and whereby initial actuation of said sixth switch actuates the second actuator, initial actuation of said third switch actuates said top and bottom slides forwardly, actuation of the first sequential contacts of said gauging switches stops the advance of the bottom slide actuator, actuation of the fourth switch slows the forward advance of the top slide actuator for a machining operation, actuation of the sixth switch returns the actuators for the jaws and top and bottom slides to their retracted positions and produces an indexing operation of the indexing table.

24. The machine of claim 23 wherein said fourth switch has first and second sequentially made contacts, the first contact of which starts a side cut machining feed of the top slide actuator, and the second contact of which starts a slow end milling feed of the top slide actuator.

25. The machine of claim 23 wherein actuation of one of the second contacts of said work sensing gauging switches causes the actuators for the jaws and top and bottom slides to return to their retracted positions and produce an indexing operation of the indexing table.

* * * * *